United States Patent [19]
Boon

[11] Patent Number: 6,022,221
[45] Date of Patent: Feb. 8, 2000

[54] METHOD AND SYSTEM FOR SHORT- TO LONG-TERM MEMORY BRIDGE

[76] Inventor: John F. Boon, 1301 Vermont St., N.W., Apt. 504, Washington, D.C. 20005

[21] Appl. No.: 09/042,635

[22] Filed: Mar. 17, 1998

Related U.S. Application Data

[60] Provisional application No. 60/042,326, Mar. 21, 1997.

[51] Int. Cl.[7] .............................. G09B 19/00; G09B 3/00; G09B 7/00
[52] U.S. Cl. ......................... 434/156; 434/118; 434/322; 434/323; 434/327; 434/362
[58] Field of Search ..................... 434/156, 157, 434/167, 169, 176, 322, 323, 327, 348, 353, 354, 362, 118

[56] References Cited

U.S. PATENT DOCUMENTS

| | | | |
|---|---|---|---|
| 3,974,575 | 8/1976 | Duncan | 35/9 |
| 3,983,639 | 10/1976 | Podkopaev et al. | 35/9 |
| 4,193,210 | 3/1980 | Turnquist | 35/9 |
| 4,770,636 | 9/1988 | Buschke | 434/236 |
| 5,267,865 | 12/1993 | Lee et al. | 434/350 |
| 5,372,507 | 12/1994 | Goleh | 434/118 |
| 5,393,236 | 2/1995 | Blackmer et al. | 434/169 |
| 5,540,589 | 7/1996 | Waters | 434/156 |
| 5,577,919 | 11/1996 | Collins et al. | 434/322 |
| 5,597,312 | 1/1997 | Bloom et al. | 434/362 |
| 5,766,015 | 6/1998 | Shpiro | 434/156 |
| 5,885,083 | 3/1999 | Ferrell | 434/156 |

*Primary Examiner*—Robert A. Hafer
*Assistant Examiner*—John Edmund Rovnak
*Attorney, Agent, or Firm*—Wilburn L. Chesser; Jones Jain, L.L.P.

[57] ABSTRACT

The invention includes a teaching machine that presents questions to the user who responds with answers. Graded interval recall is accomplished by storing the exact time and date when the user learns a correct answer. The machine determines the presentation mode and review schedule for each unit according to the length of real time that has elapsed since the user learns the material. Precise timing is designed to bridge the threshold between short-term and long-term memory by interrupting default sequencing of material to review items at an exact preset interval from the time the user learned the material.

30 Claims, 18 Drawing Sheets

```
┌─────────────────────────────────────────────────────────────┐
│ Mark - MS-DOS Prompt - LANG                    □ □ X        │
│ ┌──┐ □ □ □ □ □ □ A                                          │ ← -10
│ │Auto│                                    Ins               │
│ └──┘                                                        │
│                                                             │
│  Timing of the memory refresh rate depends on a correct system date and time!
│
│                    Tuesday, February 10, 1998
│
│  Is it the afternoon (or evening) of Tuesday, February 10, 1998 ?
│
│
│                              [Y/N]  Y
│
│                       Hit <O> to quit
│                           <N> to edit system date
│                        or <Y> to continue.
│
└─────────────────────────────────────────────────────────────┘
```

| Select - MS-DOS Prompt - LANG | _ □ X |
|---|---|
| Auto | □□□□□ A |

Ins

Name: JB2

Please enter your code name

Select - MS-DOS Prompt - LANG

Auto ☐ ☐ ☐ ☐ A ☐ ☐ ☐ Ins

CONFIGURATION PARAMETERS

To speed up 'subliminal' and 'reminder', DECREASE speed.

| | |
|---|---|
| 500 | Speed |
| F | Diagnostics |
| T | Preview (T/F) |
| 3 | Repeat number |
| 5 | Repeat level |
| T | Display previous errors |
| T | Polite prompts (T/F) |
| F | Show timer numbers (T/F) |
| F | Start from Lesson 1 |
| F | Sound |
| T | Random sequence within lesson |
| 2 | Minutes for G-Stack |

Hit <Page Down>, <Esc>, or <Ctrl-W> to save new settings

FIG. 14

```
Select - MS-DOS Prompt - LANG    [_][□][X]
[Auto  ][ ][ ][ ][ ][ ][ ][ ][A]

Ins

5        Voyager Software          v. 9.9    <- 25
                         6.67                   reg
                     Participles I                        <- 31 beat        [                    ]

beat / beaten beaten / beaten                           <- 10 days ago bent / bent                               <- 10 days ago
```

26-> beat
28-> (box)
27-> beat / beaten
29-> beaten / beaten
30-> bent / bent

FIG. 15

```
Select-MS-DOS Prompt-LANG                    _ □ X
┌──┐ ┌──┐┌──┐┌──┐┌──┐ ┌─┐
│Auto│ └──┘└──┘└──┘└──┘ │A│
└──┘                    └─┘
┌─────────────┐
│Score: 100.00 %│         Voyager Software        v. 9.9
│Aces :   8    │              6.67                reg
└─────────────┘
        5
                        Participles    Ins beat ┌──────────────────────────────┐
     └──────────────────────────────┘
```

```
Select-MS-DOS Prompt-LANG    [_] [□] [X]

Auto [ ]
     [ ] [ ] [ ]
     [ ] [ ] [ ]                                        <-40
     [ ] [A]

┌─────────────────────┐
     │ Score :  80.00 %%   │    Voyager Software           v. 9.9
     │ Aces  :  8          │         6.67                  reg
     │ Deuces:  2          │    Participles    I      Ins
     └─────────┬───────────┘
               4
    Was
41->  bore / born
           ^
42->  passive meaning give birth to, when not followed by 'by' : born.
      bear
                        ┌──────────────────────────────┐
                        │                              │
                        │                              │
                        └──────────────────────────────┘
                                     ↑
43->  bore / borne
```

Select-MS-DOS Prompt-LANG

Auto  A

Score: 92.31 %
Aces : 84

Voyager Software    v. 9.9
6.67                reg
Participles 2       Ins

8

Was
46-> besaught / besaut^
47-> beseech
48-> besaught / besaug 8
50-> bled / bled

<- 45

METHOD AND SYSTEM FOR SHORT- TO LONG-TERM MEMORY BRIDGE

This application claims the benefit of U.S. Provisional Application No. 60/042,326, filed Mar. 21, 1997.

FIELD OF THE INVENTION

The present invention relates to a method and system for providing interactive tutoring and memory training. In particular, the present invention relates to a method and system for enhanced learning of foreign language skills.

BACKGROUND OF THE INVENTION

Many computer-based teaching machine designs store questions or problems to present to the user as prompts for the correct answer or solution. The user's responses are evaluated by comparison to the stored answer and in the more sophisticated machines, the process control is influenced by the evaluation. However, existing art has a number of weaknesses. Existing art requires the user to respond with complete answers. Existing art informs the user that an incorrect answer was incorrect without informing the user exactly what was incorrect about his answer; the user often cannot identify exactly what was incorrect about his answer. Existing art normally responds to correct answers by immediately presenting the next answer. The previous correct answer disappears. Thus the user could have guessed the correct answer without actually knowing what it was, or immediately forgotten what the correct answer was. In addition, existing art processes answers as either correct or incorrect.

U.S. Pat. No. 5,540,589 to Waters, titled Fault-tolerant Audio Interactive Tutor, attempts to address some of the problems of existing art by considering answers to be correct if they are close enough, and U.S. Pat. No. 5,577,919 to Collins, et al., attempts to solve problems of the existing art by seeking to determine not whether the answer is correct or not, but merely whether the user thinks the answer is correct. Neither of these approaches attempts to deal with partially correct answers.

Other problems of existing art include the fact that existing art does not make use of subliminal suggestion to prompt the user with the correct answer. Further, existing art does not present the user with prior errors. In addition, importantly, existing art does not attempt to deal with the problem of graded interval recall taking actual elapsed real time into consideration. Material is reviewed on the basis of correctly/incorrectly answered priority, the most crude form of which is to simply repeat incorrectly answered questions. Attempts to prioritize the sequence of material on a more intelligent basis (see, U.S. Pat. No. 4,193,210 to Turnquist) can result in delays of reviews until long after the material has been lost from short-term memory.

SUMMARY OF THE INVENTION

It is an advantage of the present invention to overcome the problems of the existing art by creating a method and system that provides a short- to long-term memory bridge. It is an advantage of the present invention to solve the problem of excessive repetition by requiring the user is required to respond with only the part of the answer not yet correctly entered.

It is an advantage of the present invention to solve the problem of users being unable to identify exactly what was incorrect about an answer by immediately showing incorrect answers using a marker indicating where the answer is incorrect. With this feature, the user clearly and immediately sees the error.

It is an advantage of the present invention to solve the problem of users guessing the correct answer without actually knowing what it was, or immediately forgetting what the correct answer is by showing the previous correct answer on the screen for the user's reference. This feature reinforces the correct answer in the user's memory.

It is an advantage of the present invention to solve the problem of users knowing part of the answer. The present invention responds to partly complete answers by incrementally showing part of the correct answer. The user is required to complete the remaining part of the answer only.

It is an advantage of the present invention to prompt the user with the correct answer for a very short time on the answer line, subliminally suggesting the answer to the user. It is an object of the present invention to use the prompting technique in review mode, where the user's memory is passively reinforced by displaying the question/answer pair briefly on the screen.

It is an advantage of the present invention to solve the problem of a user being unable to make use of their prior errors by presenting the user with prior errors a given question for material that is determined to be not very well known by the user. This serves as a reference for the user to learn not to repeat previous errors.

It is an advantage of the present invention to solve the problem of graded interval recall by periodically reviewing each element of material according to the proven length of retention the user has for that element. Reviews are timed according to graded interval recall by a computation that takes into account the exact real time and date when the user first learned the element. Furthermore, it is an advantage of the present invention to use default sequencing of material in which material is interrupted by a special array called ARRAY-G, which stores the material that has been learned and when. After a pre-set interval, (e.g. twenty minutes), a period after which the user is most likely to forget, the material is reviewed, thereby bridging the gap between short-term and long-term memory.

The present invention is embodied in a series of flow charts automatically implemented, such as on any general-purpose computer, including "personal" microcomputers. Those skilled in the art will recognize that the same logic used for written questions/written answers can also be used in, but not limited to audio questions and aural responses (i.e., in study of pronunciation and elocution), as well as graphics and other GUI systems (e.g., in the study of anatomy or other charts to which the user responds by pointing and clicking on the response with a mouse).

An embodiment of the present invention carefully times and tracks the user's progress without exerting any pressure or rushing the user. The present invention stores the time and date when the user learns an answer, and the amount of time elapsed from that date is used to determine the presentation of the material and the schedule of reviews.

The program logic of the present invention reviews material that has been retained for a preset time (e.g., twenty minutes) so that the material in the user's short-term memory becomes ingrained in the user's long-term memory. The present invention tracks the user's progress on each memory item over time in exact detail with a 14-point gradation of retention levels.

An embodiment of the present invention includes a database with records containing problems or questions with their correct answers or responses. A field in each record stores a value used to indicate the level of retention the user has for each question/answer pair. This value is used to determine the display and response mode for each record. The display and response modes require greater retention as the material becomes more familiar. Conversely, display and response modes again become easier for question/answer pairs that the user has forgotten. Thus the retention value is constantly adjusted to reflect the user's performance.

Additional advantages and novel features of the invention will be set forth in part in the description that follows, and in part will become more apparent to those skilled in the art upon examination of the following or upon learning by practice of the invention.

BRIEF DESCRIPTION OF THE FIGURES

FIG. 12 is a screen print showing the request for the user to verify the system date and time for an embodiment of the present invention.

FIG. 13 is a screen print showing the second screen where the user enters a password for an embodiment of the present invention.

FIG. 14 is a screen print showing the configuration parameters being edited for an embodiment of the present invention.

FIG. 15 is a screen print showing display of a q/a pair in EASY display mode, first two iterations for an embodiment of the present invention.

FIG. 16 is a screen print showing display of a q/a pair in EASY display mode, third iteration for an embodiment of the present invention.

FIG. 17 is a screen print showing display of a q/a pair in LEARN mode for an embodiment of the present invention.

FIG. 18 is a screen print showing display of a q/a in response to an incorrect answer for an embodiment of the present invention.

DETAILED DESCRIPTION

Figure 1:
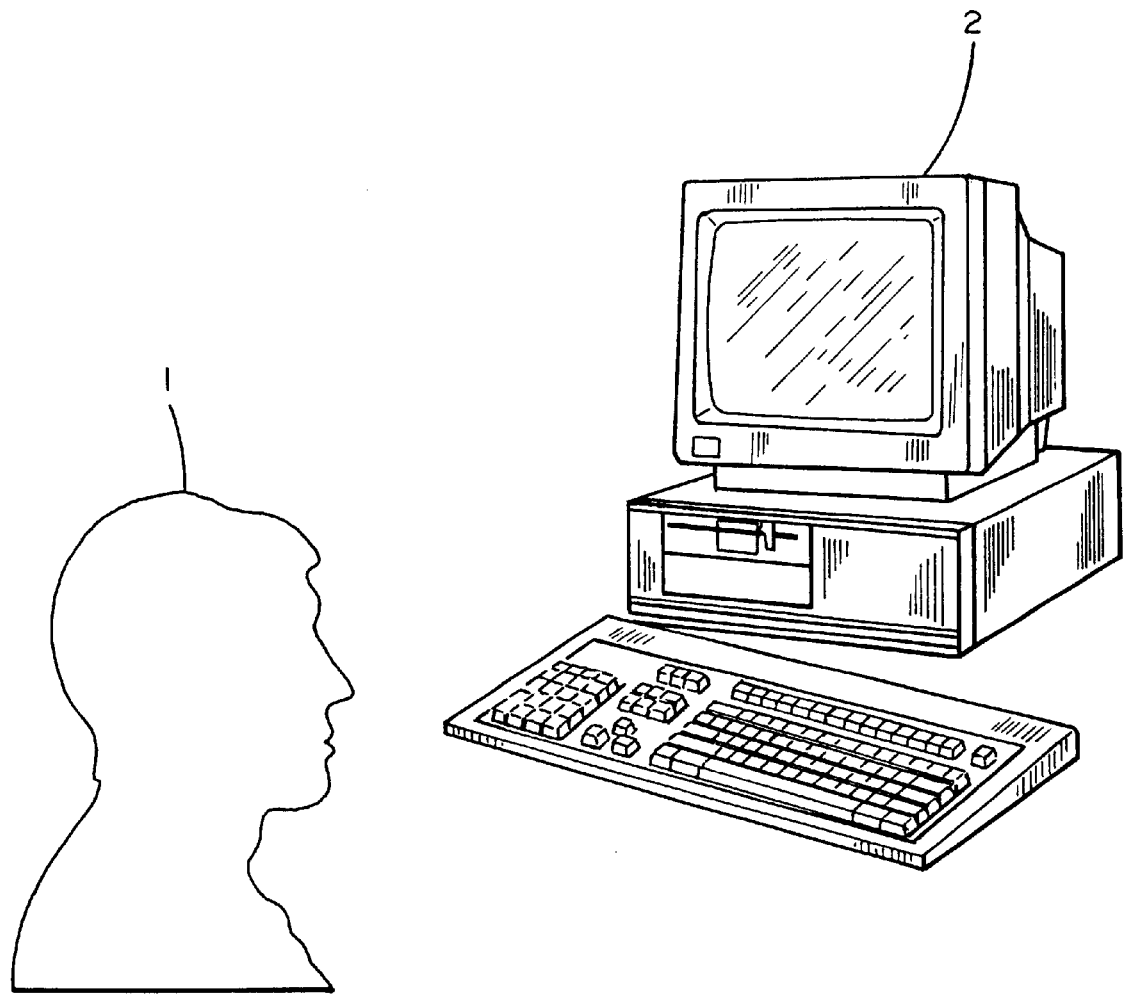
FIG. 1 shows an overview of an embodiment of the present invention as it is being used by person sitting at workstation.

An embodiment of the present invention includes a series of flow charts automatically implemented, such as on any general-purpose computer, including "personal" microcomputers. Those skilled in the art will recognize that the same logic used for written questions/written answers can also be used in, but not limited to audio questions and aural responses (i.e., in study of pronunciation and elocution), as well as graphics and other GUI systems (e.g., in the study of anatomy or other charts to which the user responds by pointing and clicking on the response with a mouse).

An embodiment of the present invention carefully times and tracks the user's progress without exerting any pressure or rushing the user. The present invention stores the time and date when the user learns an answer, and the amount of time elapsed from that date is used to determine the presentation of the material and the schedule of reviews.

The program logic of the present invention reviews material that has been retained for a preset time (e.g., twenty minutes) so that the material in the user's short-term memory becomes ingrained in the user's long-term memory. The present invention tracks the user's progress on each memory item over time in exact detail with a 14-point gradation of retention levels.

An embodiment of the present invention includes a database with records containing problems or questions with their correct answers or responses. A field in each record stores a value used to indicate the level of retention the user has for each question/answer pair. This value is used to determine the display and response mode for each record. The display and response modes require greater retention as the material becomes more familiar. Conversely, display and response modes again become easier for question/answer pairs that the user has forgotten. Thus the retention value is constantly adjusted to reflect the user's performance.

In an embodiment of the present invention, the letter "Q" represents this value for the purposes of this document. (See Appendix A for more detailed explanations of the terms used or coined in this document.) Q is initially set to 1, corresponding to the EASY display mode, where the answer is shown with the question for the user to copy. This is shown in FIGS. 15 and 18. When this is successfully accomplished, Q is set to 2 for that record, corresponding to the LEARN display mode.

When the user correctly responds to a question displayed in LEARN mode, the Q is set to 3 and the date and time are saved. The item is displayed in QUICK mode in its turn for amount of time associated with the Q level shown in Table 2. When Q reaches 3, the material is shown to the user in order to be fresh in the user's short-term memory. The time and date of this event is stored in the database in the field named "G-time" (step S64). When this happens, an element is also added to an array called ARRAY-G which includes the time, date, and record number when this occurs (steps S63 and S64). The structure and layout of ARRAY-G is also explained in greater detail in Appendix A.

In an embodiment of the present invention, reviews are timed by an algorithm that uses three factors so that the reviews occur as close as possible to the threshold at which memory items are most likely to be conducted from short-term into long-term memory (e.g., from five to a maximum of twenty minutes) (step S28). These three factors are: 1) the value of Q (1–14), ranging from one, denoting unknown or forgotten material, and 14 for material that has been correctly remembered for thirty days or more; a Q value of 6, for example, corresponds to a retention time of at least ten minutes; Table 2 shows the correlation between Q level and proven retention time; 2) the actual length of time elapsed since the record was learned (time elapsed from the time that Q reached three); this time is calculated by comparing the G-Time (i.e., the stored time and date stamp of the event when the Q reaches the value of three), with the system time (i.e., today's date and time in the computer); this difference between the two times is named 'E-Time'; 3) a third factor is looked up in the table that correlates each possible value of Q (1–14) to a specific length of time (five seconds to thirty days.)

Reviews are thus triggered by expiration of the duration of time associated with the q/a pair's Q. Similarly, reviews are also triggered by expiration of the time in the array ARRAY-G. This ensures that no reviews are delayed past the cutoff time because of time taken up by displays of other material.

Thus, reviews come progressively less frequently with longer retention (greater Q). Q and E-time are also used to determine how much to increment a word's Q is after a review. All of this takes place in the logic called "Get Word Profile" (step S3). (Step S3 is further detailed in steps S26 through S40.)

Incorrect answers in a review cause the Q for that question/answer pair to be reset to two, corresponding to the LEARN display mode. When this happens, the learning cycle for the record restarts. When the value of Q again reaches three, the base date for timing reviews (G-time) is also reset, thus initiating a fresh review schedule.

The present invention eliminates redundancy. Once a word or phrase has been remembered correctly, it retires to a status that brings it to the user's attention only passively until time indicated by the Q level elapses, triggering a review. Thus, the longer the user remembers an item, the less frequent the review of that item. Until a review is scheduled, intermittent displays of the item are in the QUICK mode, in which the question is displayed on the screen in its turn along with the answer; however, this display is a passive mode, for progressively shorter durations approaching subliminal speeds. If a review shows that a word or phrase has been forgotten, the program brings the word back into an active learning mode for more attention.

In an embodiment of the present invention, there is no need for the user to guess what was incorrect about an incorrect response, because it is displayed on the screen with a pointer pointing to the error (as shown in FIGS. 17 and 18 at 'A'). An incorrect response automatically induces a hint, wherein the correct part of the answer plus the next letter of the unknown part of the answer is displayed on the response line (see FIG. 18 at 'C'). Incorrect responses and their dates are also saved for optional display on successive iterations (see FIG. 15 at 'D' and 'E').

Correct answers that were not correct on the first attempt are also shown on the screen for a few moments for reference and reinforcement (step S56). Correct answers optionally can appear on the answer line quickly as a subliminal suggestion (step S40).

Other variables are stored in a second database structure called SYS. These variables include preset timers for the previews and for quick displays, sound on/off toggle, parameters for determining the sequence of lessons (same, previous, or next) (step S25), and whether or not the records are displayed in random sequence within better-known lessons.

Optimal review schedules are specifically timed in the present invention to bridge the threshold between short-term and long-term memory.

In an embodiment of the present invention, the vocabulary databases are modular, replaceable, and user-selectable and may be edited or added to by a system administrator familiar with the meaning of the data structures.

An embodiment of the present invention has alternate versions of the Q-time table dynamically activated depending on a number of factors, which include the user's learning profile, configuration settings, and internal logic. Alternate timers have less intensity (less frequent review) and fault-tolerant comparison analysis, while other more rigorous timers resume control when the user is progressing (remembering) well. Databases containing literature in various languages, language spoken by native speakers of various languages, and graphics databases for study of anatomy and astronomy are included in an embodiment of the present invention.

References will now be made in detail to an embodiment of the present invention, an example of which is illustrated in the accompanying drawings.

FIG. 1 shows an overview of an embodiment of the present invention as it is being used by person 1 sitting at workstation 2, such as a personal computer.

Figure 2:
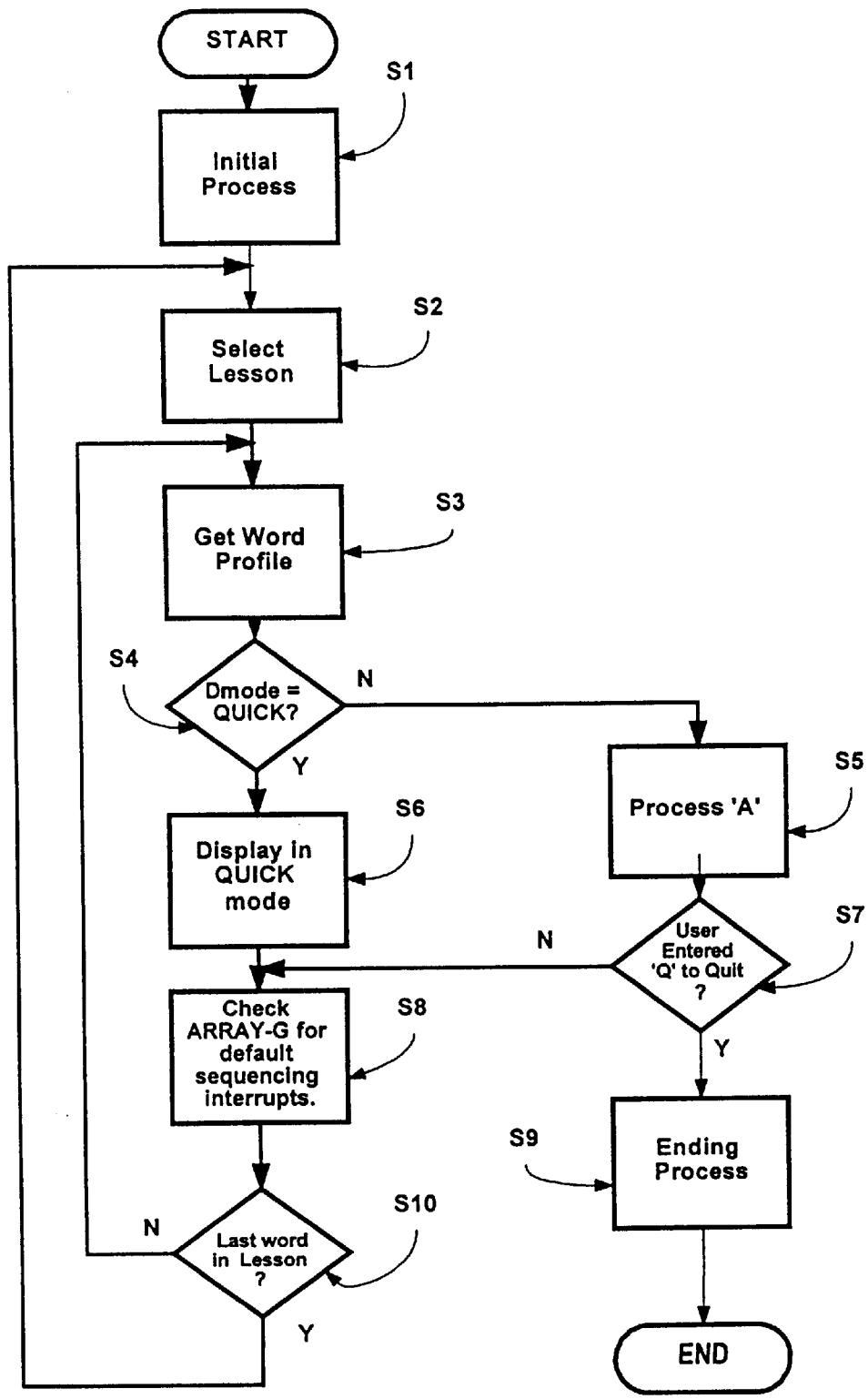
FIG. 2 is a flowchart of the overall logic of an embodiment of the present invention.

FIG. 2 is a flowchart of the overall process for an embodiment of the present invention. Step S1 is the initial process, which is shown in greater detail in FIG. 3. Step S2 is the process whereby the first and subsequent lessons are selected, shown in greater detail in FIG. 4. Step S3 is the process called Get Word which takes place immediately before a question/answer pair is presented to the user, shown in greater detail in FIGS. 5 and 6. Step S4 is a decision that sends logical control in one of two different directions, depending on whether the display mode for the question/answer pair is QUICK display or not.

Step S5 is "Process A," which includes displaying the question/answer pair in EASY or LEARN mode, analyzing the user's response and processing correct and incorrect responses. "Process A" is shown in greater detail in FIGS. 7, 8 and 9. Step S6 consists of displaying in "QUICK" mode: both the question and the answer of a pair with a Q of three or higher (higher in reviews in an embodiment of the present invention) are briefly displayed on the screen along with the answer (step S40) thus keeping the user from constantly repeating the same material. The duration of this display is determined by three parameters: 1) the system setting DWELL (step S20); 2) the Q (the greater the Q, the shorter the duration of the display); and 3) the relative length of the answer (longer words displayed longer).

The idea of the present invention is to contact the user's subconscious or subliminal recall by flashing the answer at speeds that the user may not even notice. The same factors determine the duration of displays of a "Preview" (step S40).

Step S7 is a decision step for responding to a user's request to end a session. Step S8 is the process whereby an array (ARRAY-G) of record numbers and time and date data is read to determine if any q/a pairs need to be reviewed by temporarily interrupting the default resequencing, shown in greater detail in FIG. 10. Step S9 is the ending process wherein the last lesson presented is saved, files are closed and the session terminates, shown in greater detail in FIG.

11. Step S10 is a decision to determine whether a lesson boundary has been encountered.

Figure 3:
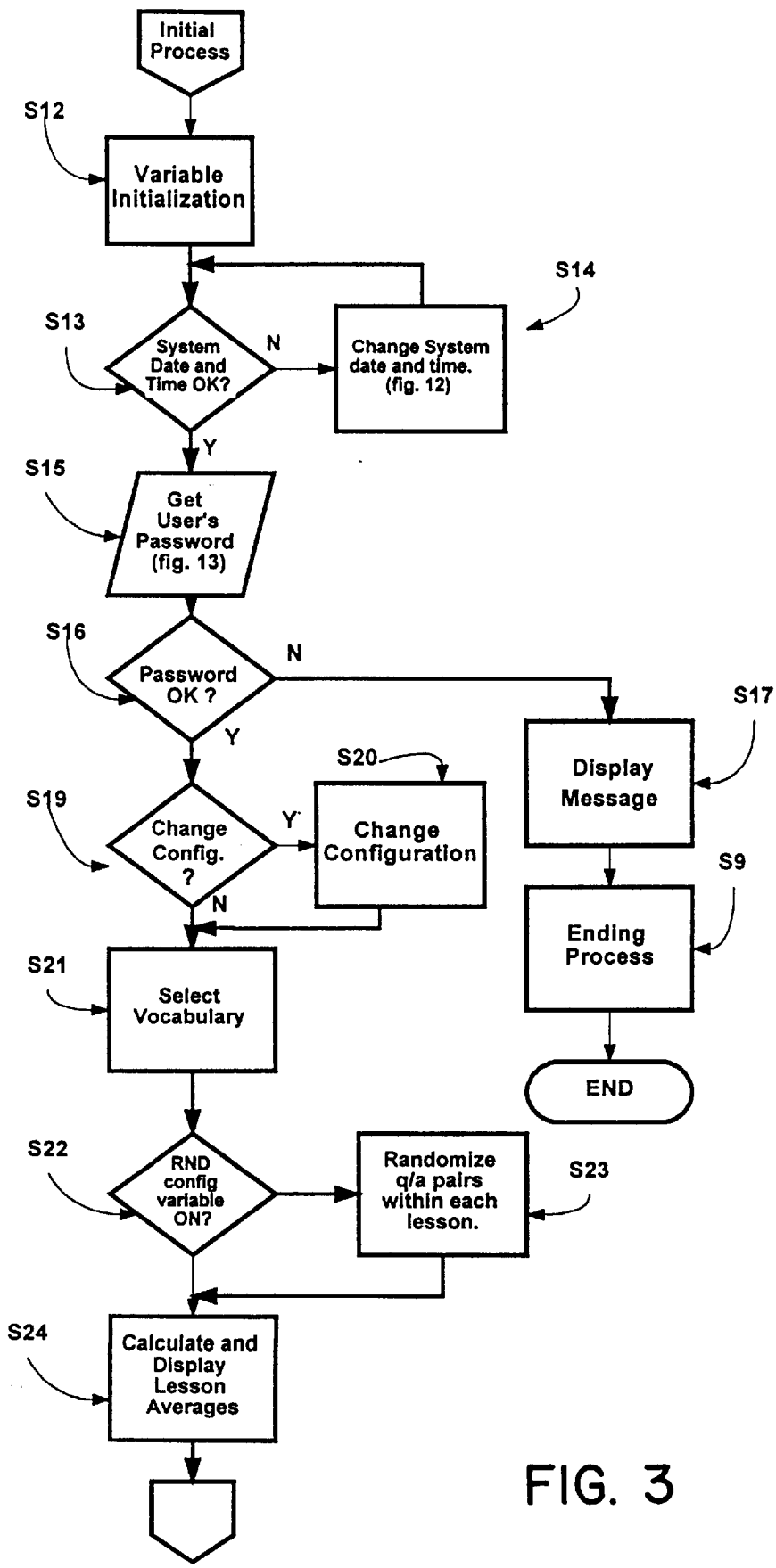
FIG. 3 is a flowchart of the details that comprise the initialization process for an embodiment of the present invention.

FIG. 3 presents the initialization process for an embodiment of the present invention. Step S12 initializes variables used in the rest of the program. Steps S13 and S14 verify system date and time and change the system date and time if the user hits "N" to do so (see also FIG. 12). Since timing of the reviews depends on accurate system time on the machine, the startup screen asks the user to verify the system time. If at this point, the user enters "N", control passes to the DOS Date and Time functions so that the date and time can be changed (step S14). The screen persists until the user enters "Q" (to quit), or "Y" (to continue). Most computers will already have the correct system date and time, and on such systems the user can simply press <Enter> to accept the default "Y" in response to this first screen.

In steps S15, S16, S17 and S18 the system obtains and verify the user's password (see also FIG. 13). The user enters their code name, which, for security purposes, in an embodiment of the present invention cannot be changed. If the entered password is not the correct one (i.e., password is nonidentical to authorized password), the message: 'User not registered . . . Exiting . . . ' appears, and the program ends.

Steps S19 and S20 allow the user to change the configuration (see section in Appendix A called Configuration Parameters for the screen and complete descriptions of the parameters that are editable if the user elects to do so at this point; see also FIG. 14). In step S21 the user selects the vocabulary. Once the password is correctly entered, a screen appears containing the following information:

Screen 2:

Target Language

P: Portuguese T: Tagalog R: Russian

S: Russian Roots

Hit <F5> to edit System Parameters

Hit <Q> to quit or <F5> to edit configuration parameters. The user can press P, T, R, S, or B to select one of the vocabularies or exit by pressing Q. To change configuration settings, <F5> is pressed before selecting the vocabulary.

In steps S22 and S23, if the configuration parameter RND is toggled on, random numbers are generated to populate the RSEQ field in the q/a pair database, and the q/a pairs are presented in random sequence within each lesson.

Step S24 calculates and displays lesson averages to show users' progress as they learn the material. A database file named avrg.dbf us used to store the averages for each lesson, which is the average Q for all the question/answer pairs for each lesson. Since the range of possible values of Q is from one to fourteen, a factor (14/100) is used to express the average in percent. At the end of a session, the averages are computed again and compared with the averages at the start of the session and the difference is displayed on the screen. If the configuration parameter RND is set to 'T', lessons with above average Q are randomized during this process. (Note: these averages can be developed in a wide range of ways in order to develop other learning curve profiles, fine-tune lesson contents, or as a criterion for lesson selection, for example.

Figure 4:
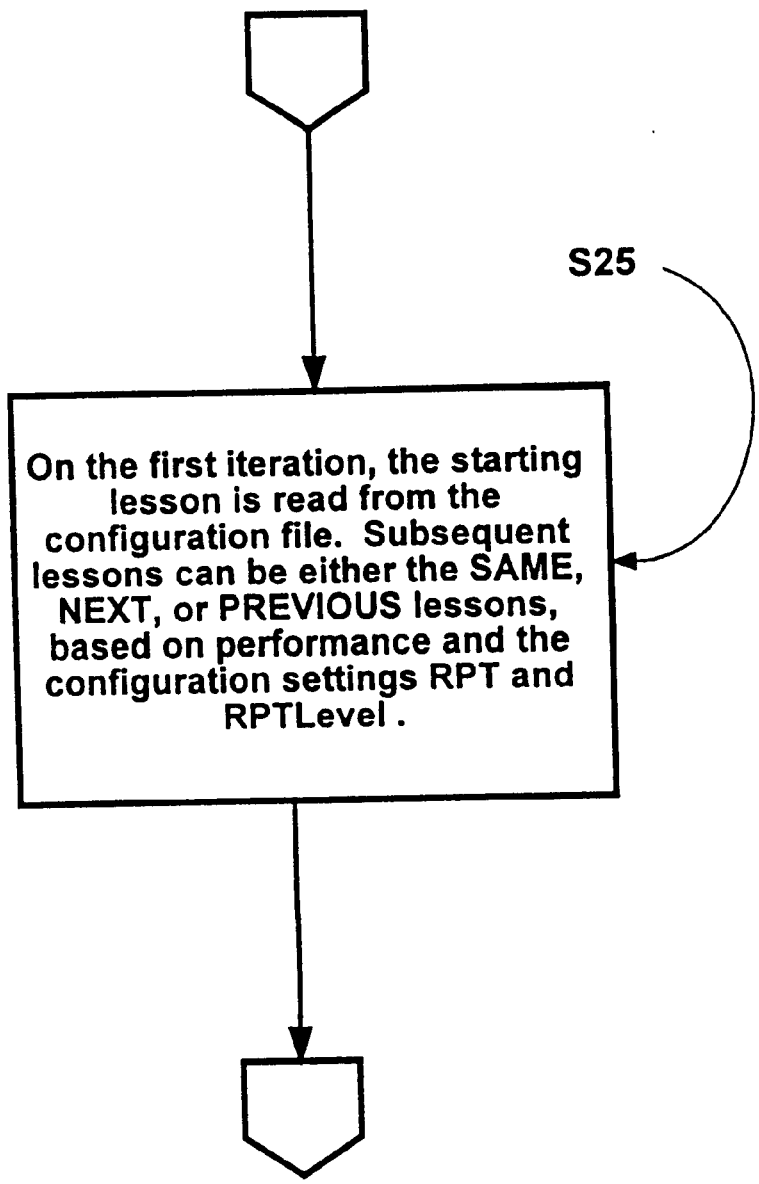
FIG. 4 is a flowchart of the process by which the starting and subsequent lessons are selected for an embodiment of the present invention.

FIG. 4 presents the flow chart for Select Lesson, shown in a single step (step S25), for an embodiment of the present invention. At the start of a session, the first lesson presented is the one previous to the one with which the user left off in the previous session, as stored in the system database file SYS.dbf. Determination of subsequent lessons is made by evaluating the lowest Q value found within the lesson. The lesson is well learned if all the words in the lesson have a Q equal or greater than the REPEAT LEVEL. If this is the case, the next lesson in the vocabulary is selected. If any word in the lesson has a Q that is lower than the REPEAT LEVEL, the same lesson is repeated. If the lesson is repeated more times than REPEAT NUMBER, the previous lesson is selected. For more explanation, see the definitions of REPEAT LEVEL and REPEAT NUMBER in the "Configuration settings" section of App. A. This is depicted in the flowchart in S25.

Figure 5:
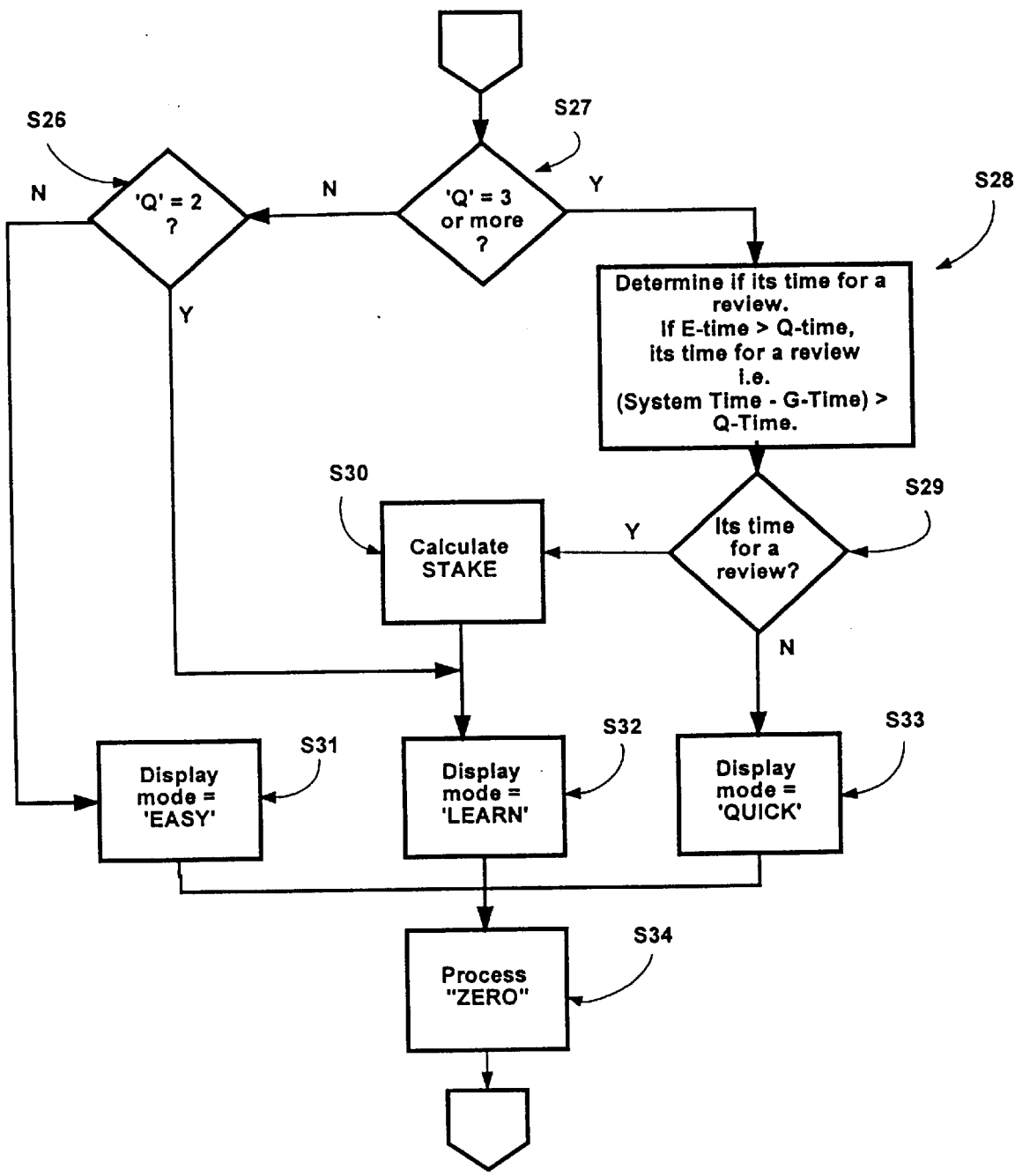
FIG. 5 is a flowchart of the process that determines the display mode, calculates whether its time for a review, and calculates the STAKE for an embodiment of the present invention.

FIG. 5 presents the Get Word Profile for an embodiment of the present invention. Steps S26 and S27 are decision steps that depend on the display mode of a q/a pair. As the session progresses, each question/answer pair in a lesson is processed through one of three possible display modes. Before the word is displayed, the display mode is determined according to the following logic. The display mode (DMODE) for a given word is correlated to the Q: 1) if the Q=1, the DMODE is "EASY"; 2) if the Q=2, the DMODE is "LEARN"; 3) if the Q=3 or greater, the DMODE is "QUICK."

The above holds true in all cases except for the reviews. For reviews, the word is displayed in LEARN mode regardless of the Q value.

In step S28 it is determined if its time for a review. A review of a q/a pair can occur if the Q value for the q/a pair is three or greater. The significance of the Q being three or more is that the user has demonstrated retention of the correct answer for at least a certain amount of time. That amount of time is the corresponding Q-time on the Q-time table. The Q-time table correlates values of Q to lengths of time. The Q-time corresponding to the Q of a word is the minimum amount of time that must elapse before the word is reviewed. Words with a Q of three or more are displayed in QUICK mode as long as the E-time (the time elapsed since the Q reached three) is less than the Q-time.

To make the determination of step S28, the program logic does three things: first, the E-Time (the time elapsed since the Q reached three) is calculated. When the Q reaches three, the system time and date are stored as the G-Time (step S64). Time arithmetic is used to subtract the system time (which is the current real time) from this G-Time to get the E-Time (elapsed time). Secondly, the 'Q-Time Table' is used to look up the amount of time associated with the word's Q. The meaning of the Q-Time is that the user has already demonstrated retention of the correct answer for at least this amount of time. Thirdly, the E-Time is compared to the Q-Time. If the E-Time is greater than the appropriate Q-Time, then it is time for a review.

Step S29 is a decision based on the calculation made in S28, which passes control to process a review or display the q/a pair in QUICK mode. In step S30, the STAKE is calculated. STAKE is the value to which the q/a pair's Q is incremented if a response to a review is correct. Using the default sequencing, only q/a pairs with a value of two are displayed in LEARN mode. In this case, correct answers cause Q to be incremented by one, resulting in an new Q of three (step S59) and also causing G-Time to be saved in both the q/a database and in the array (in RAM) ARRAY-G with the record number (step S64). However, during a review, a correct answer demonstrates that the user has retained the correct answer for at least the amount of time that has elapsed since the q/a pair's G-Time (which is the E-time, or elapsed time). The value of Q in the Q-time table which correlates to that amount of the q/a pair's E-time is the value of Q to which the Q of the q/a pair gets incremented if the user responds correctly to a review. Proof of retention indicated by longer than an increase of Q by one is "at stake".

Steps S31, S32 and S33 are the presentations of the q/a pair in EASY, LEARN, and QUICK display modes respectively. Step S34 is process "ZERO," which is broken into component steps S35 through S40, as shown in FIG. 6.

Figure 6:
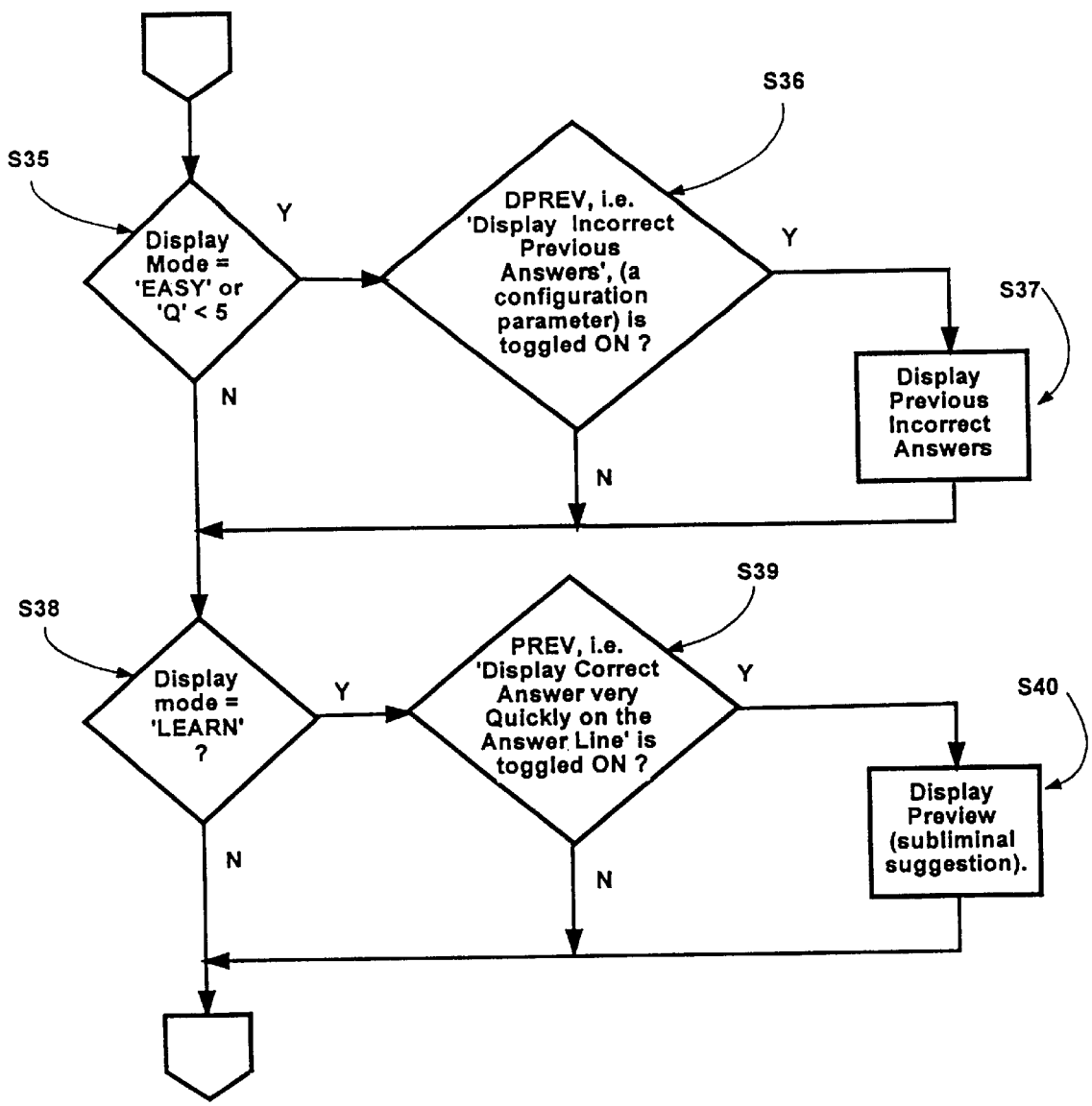
FIG. 6 is a flowchart of the process whereby previous incorrect answers and the subliminal suggestion preview are displayed on the screen for an embodiment of the present invention.

FIG. 6 presents the process "Zero" for an embodiment of the present invention. Depending of the settings in SYS.dbf and the display mode of the q/a pair as indicated in FIG. 6, certain things are displayed on the screen. If the display mode is EASY or QUICK and "PostView" is toggled on (steps S35, S36 and S37), prior incorrect answers are displayed at the bottom of the screen with a pointer pointing to the exact place in error. If the display mode is LEARN and "Preview (subliminal suggestion)" is toggled on, the answer is displayed for a short time. Three parameters determine the duration of the display: 1) the first parameter used to determine the duration of this display is the system setting DWELL (step S20); 2) the second parameter used to determine the duration of this display is the Q value; the greater the Q, the shorter the duration of the display; and 3) the third parameter used to determine the duration of this display is the length of the answer relative to the average length of all the answers; longer words are displayed longer; the length of time in an embodiment of the invention is adjusted exactly so that the user has time to read lesser known material while better known material is flashed on the screen only enough to affect subliminal suggestion (steps S38, S39, and S40).

Figure 7:
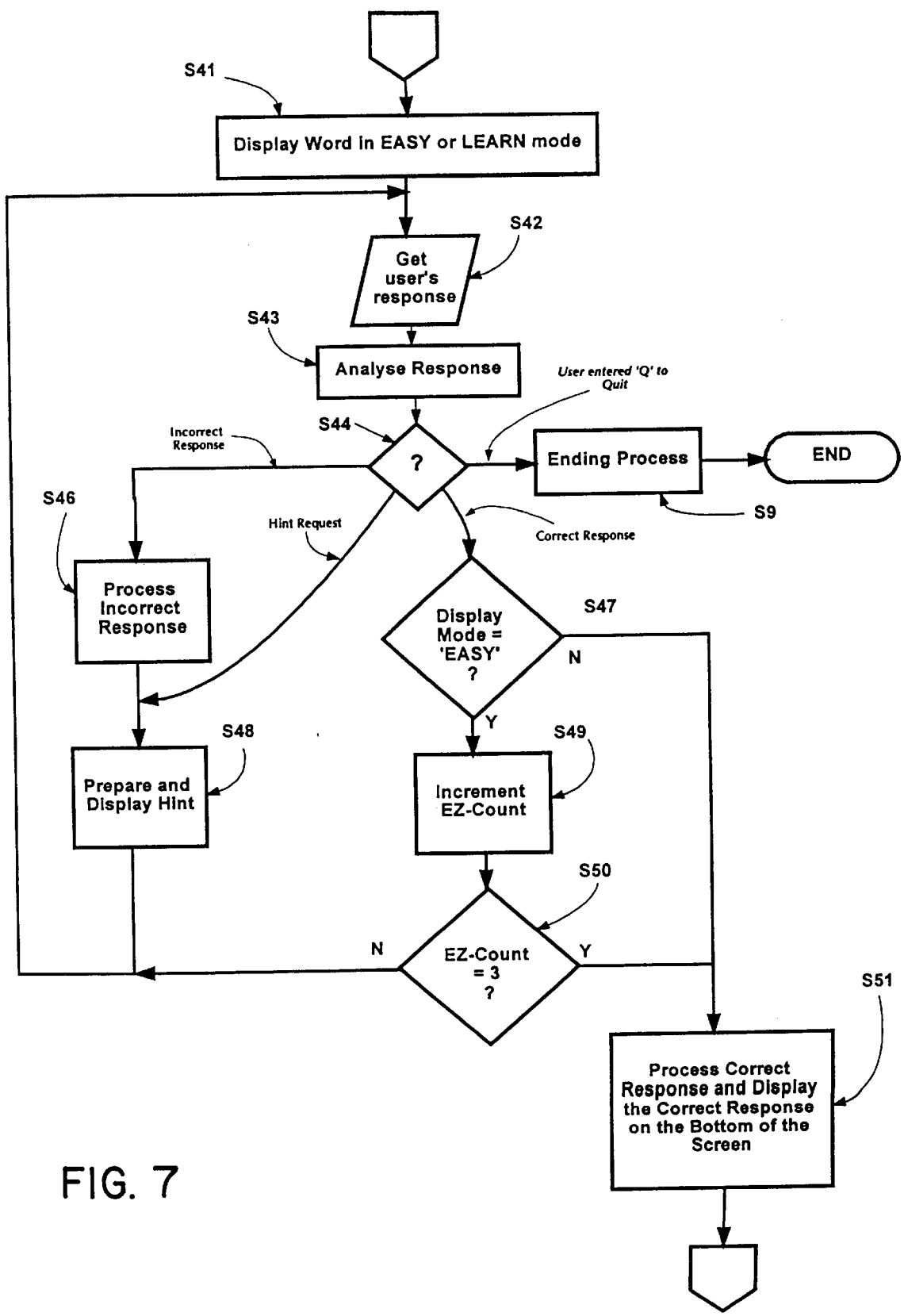
FIG. 7 is a flowchart of the analysis of the user's response during EASY or LEARN display modes for an embodiment of the present invention.

FIG. 7 presents the process "A" for an embodiment of the present invention. In step S41, the word is displayed in EASY or LEARN mode. The word is displayed on the screen just above the response line. In EASY mode, the word is displayed and responded to three consecutive times. The answer is displayed in red just below the response line, but only for the first two of the three times. In this mode, the user simply copies the answer. If the configuration parameter PREVU is toggled on, in LEARN mode, words with a Q value under 7, corresponding to a minimum of 20 minutes of retention are previewed at near-subliminal speeds. The duration is determined by a similar algorithm as the display in QUICK mode (step S6).

In an embodiment of the present invention, the user's subconscious or subliminal recall is activated by flashing the answer at speeds that the user may not even notice. The database structure that contains the q/a pairs also contains useful information that is displayed on an otherwise blank area of the screen; this information can include the location of a punctuation key in Cyrillic, the aspect of a verb, or the resolution of an ambiguity. Another field contains the answer as it is displayed when the user inputs the correct answer. This answer might not always be the same as the expected answer that the user inputs; this allows the system to convey additional useful information. For example, this information can include the accented syllables shown in capital letters. (See also FIGS. 15 and 16 for examples of a display in EASY display mode, and FIG. 17 for an example of a display in the LEARN display mode.)

In step S42 the user's response is inputted. The cursor stays on the response line until the user keys in a response and hits <Enter>, points with the mouse cursor and clicks, or otherwise indicates the completion of a response. In step S43 the response is analyzed. In step S44, the user's response is categorized as one of the four possible classes of answer: 1) correct response; 2) incorrect response; 3) hint request; or 4) indicator to end the session. Each case follows a different logical path: a) a response of 'Q', 'q', or the equivalent Cyrillic key ends the session and control is passed to the ending process (step S45) and the session ends; b) the keys '<', '>' <F2>, <F3>, as well as a response of <Enter> in the absence of any additional input are all treated as requests for a hint. Pressing the 'less than' key (<), <F2>, or <Enter> cause the correctly answered part keyed in (if any) plus one more character to be displayed on the answer line as a hint. The user is then required only to respond with the part of the answer not already shown. The keys '>' and <F3> bring up the next word of the answer with corresponding truncation of the expected answer. A request for a hint is treated as a wrong answer for purposes of determining the "fresh" attribute of the word (see terminology).

Figure 8:
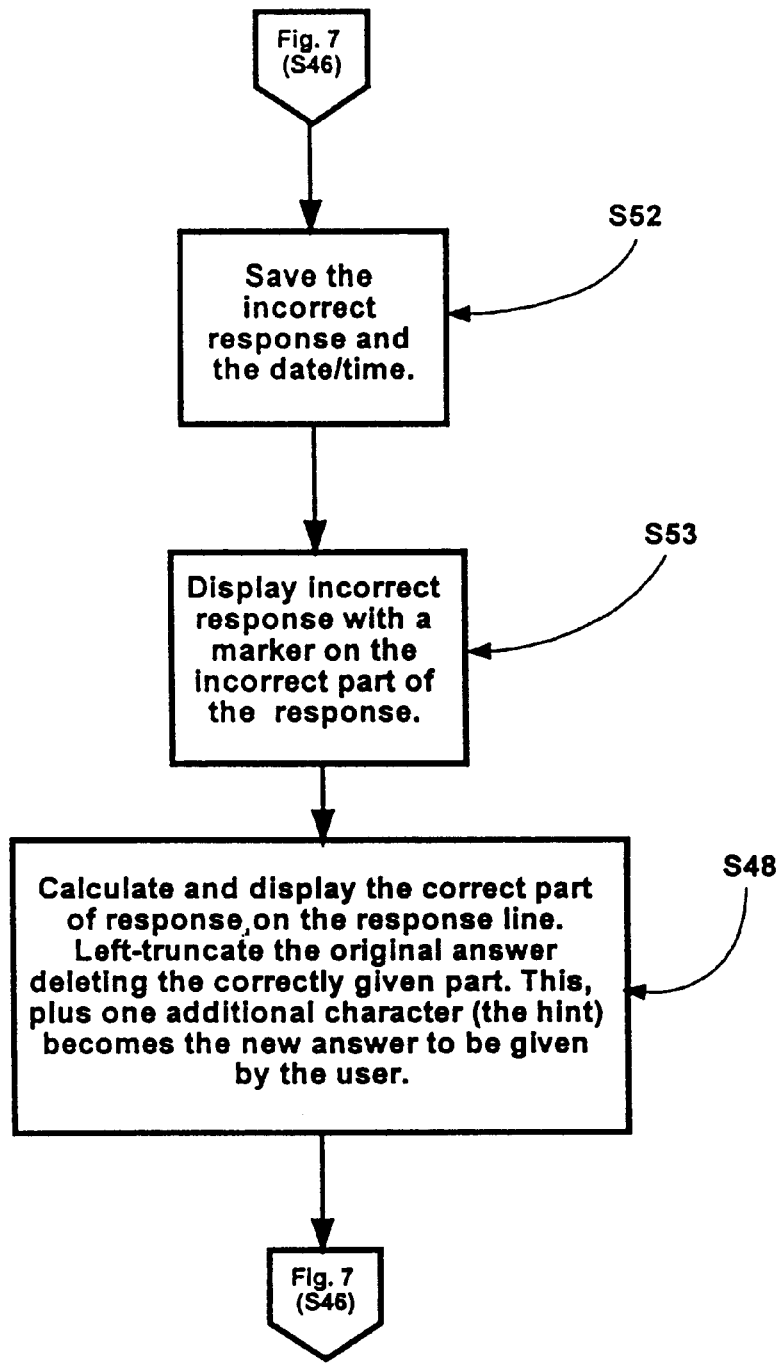
FIG. 8 is a flowchart of the process for incorrect responses for an embodiment of the present invention.

Step S46 provides the process for an incorrect response. This is a three-part inline process described in detail in steps S52, S53 and S54, as shown in FIG. 8. In step S47 it is determined whether to direct the progress of a display in EASY display mode through three iterations. (See also FIGS. 15 and 16.)

In step S48 the system displays on the response line the correct part of the response and left-truncates the expected answer to include only the part remaining that has not been correctly entered yet. The cursor is positioned at the next required character. The user needn't re-enter the correct part of the answer, but starts entering at the incorrect part. A hint is prepared and displayed. If the user specifically requests a hint by pressing the less than (<) or <F2> key, the next letter of the answer is displayed on the response line, the same as if the user keyed an incorrect character. If the user presses the greater than (>) or <F3> key, the next word of the answer is displayed on the response line. An incorrect answer as well as a response of <Enter> with no additional input from the user are each interpreted as a request for the next letter of the answer. A hint request causes the remaining answer to be truncated the same as an incorrect guess.

Steps S49 and S50 increment a counter and process a display in EASY mode through three iterations. (See also FIGS. 15 and 16.) Step S51 contains a process for a correct response, as further described in steps S55 through S64 shown in FIG. 9. In step S51A the system displays the correct response on the bottom of the screen for the user's reference.

FIG. 8 presents the process for an incorrect response for an embodiment of the present invention. In step S52, the incorrect response is saved in the q/a pair database for optional later display (see step S37), with the date and time also optionally displayed for the user's reference. (See FIG. 18, which shows the screen after the user has responded incorrectly.) In step S53 the incorrect answer is displayed above the response line with the error clearly marked. This feature provides the user with an unprecedented opportunity to see and contemplate at will their exact error in stark contrast to the jeers and other abuse that too often accompanies classroom errors.

Figure 9:
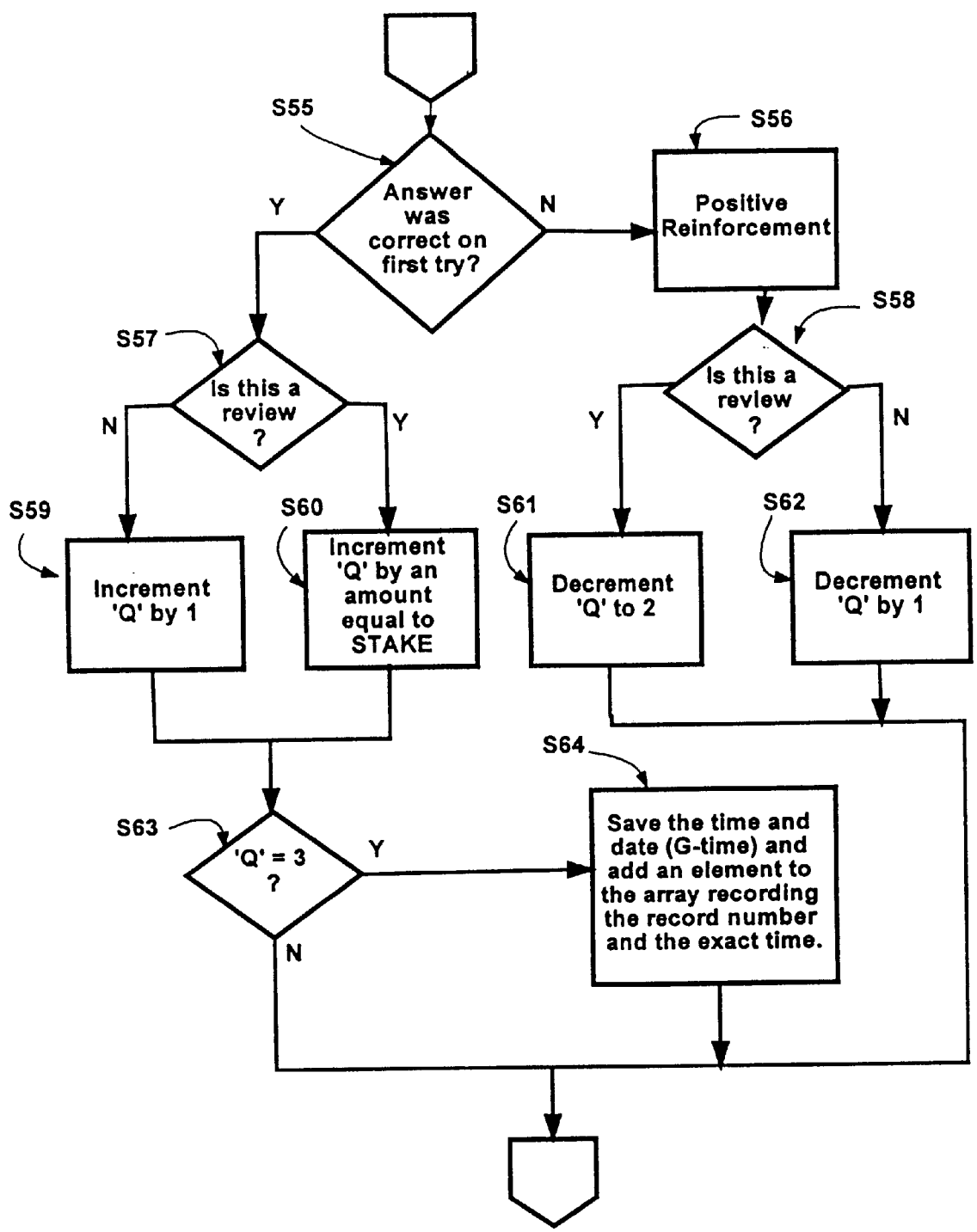
FIG. 9 is a flowchart of the process for correct responses for an embodiment of the present invention.

FIG. 9 presents the process for a correct response for an embodiment of the present invention. In step S55, the system determines whether a response was correct on the first try. If so, positive reinforcement (step S56) is actuated. Since a certain situation warrants positive reinforcement. The answer remains for a longer time than usual on the response line, and in an accented color if the q/a pair originally had a high Q value (greater than the) but the answer was not correct on the first attempt. Since this is a case when the user has forgotten something that was at one time remembered, the additional exposure helps to secure the material in the user's memory.

Steps S57 and S58 are equivalent decisions based on whether the display is a review. In step S59, the q/a pair's Q value is incremented by one. This happens when a correct response is given on the first iteration (a "fresh" response)

for words displayed in LEARN mode or in the third iteration of the response cycle in EASY mode. In step S60, the q/a pair's Q value is incremented by "STAKE". In cases where the q/a pair is being processed because of a review (E-time is greater than Q-time) and the first response is correct, the user's retention has been proven for a length of time that corresponds to a Q increase corresponding to the E-time, which can represent an increase of Q by an amount greater than one. The value of STAKE is calculated in step S30, described above.

In step S61, the system decrements the Q to two. This happens when the first response to a review is incorrect. This means that the user has forgotten (or otherwise missed) the answer. The Q value is reset to two so that the word will again appear more frequently, and so that if the user's response at level 2 (LEARN Mode) is also incorrect, the Q will be decremented to one. With Q set to one, the display mode is EASY MODE, allowing the user to painlessly relearn the word. Thus reviews constantly refresh the learning cycles for unlearned material.

In step S62 the system decrements the Q by one. When the response is not "fresh" (not a review), the system designates the word for display in EASY MODE the next time the word is displayed. In steps S63 and S64, the system saves the G-Time. When a word is displayed in LEARN MODE (but not a review) and the response is correct, this means that the user has learned the word and keyed it in correctly on the first attempt without any hint. The Q is then set to three. The date and time of this event is saved in the field called G-time. This is the G-time that is used to determine the timing of reviews of the q/a pair (step S28).

Figure 10:
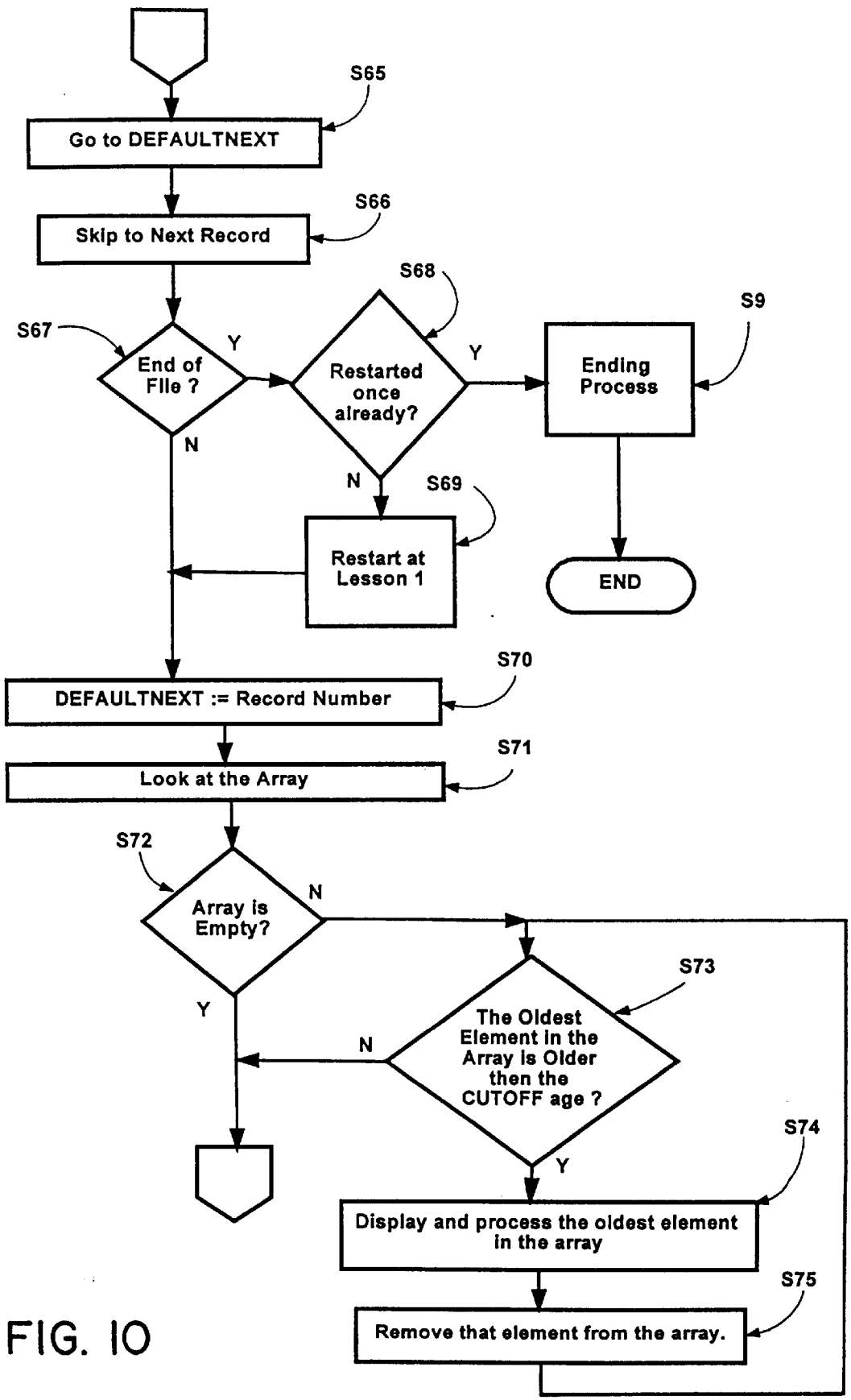
FIG. 10 is a flowchart of the process where an array of data elements is read to determine if default sequencing is to be temporarily interrupted so that the user's memory can be refreshed and tested at a preset interval to optimize the transfer of items from short-term into long-term memory for an embodiment of the present invention.

FIG. 10 presents the steps for looking at ARRAY-G and processing newly learned material for an embodiment of the present invention. When the Q of a question/answer pair reaches three, an element is added to an array (ARRAY-G) that includes the time, date, and record number. Each time before a new question/answer is presented, this array is read to see if it any element has been included in the array for more than a preset interval (e.g., twenty minutes). If any element as been in the array long enough for default sequencing, the process is interrupted so that any and all these elements can be reviewed while they are still fresh in the user's short-term memory. These array elements are then removed from the array and control is returned to default sequencing.

In step S65, the system returns to the record that was saved in the variable DEFAULTNEXT. This is necessary since the array might temporarily interrupt default sequencing, in which case, the record DEFAULTNEXT is the next q/a pair to displayed after control is returned to the default sequencing. In step S66, the system skips to the next record in the sequence. In step S67, the system tests for end of file condition. If there is an end of file condition, in step S68, the system checks a variable to see if the cycle of lessons has been restarted from lesson one already once during the session. If it has, the ending process step S45 is done, and the session ends. If not, the cycle of lessons restarts from lesson one (see step S69).

In step S71, the system saves the record number in the variable DEFAULTNEXT so that sequencing can return to the default sequencing if the array triggers an interruption of the default sequencing to display q/a pairs indicated in the array. In step S72, the array is looked at to determine if there are any elements in it. If so, in step S73, the array is again examined to determine if any of its elements have been included in the array for longer than a preset interval (CUTOFF). (See Configuration settings in App. A for more about the variable CUTOFF). If the array contains elements that have been included in the array for longer than the reset interval CUTOFF, those elements are the next to be displayed (step S74). After processing the q/a pair, its pointer is removed from the array (step S75).

Figure 11:
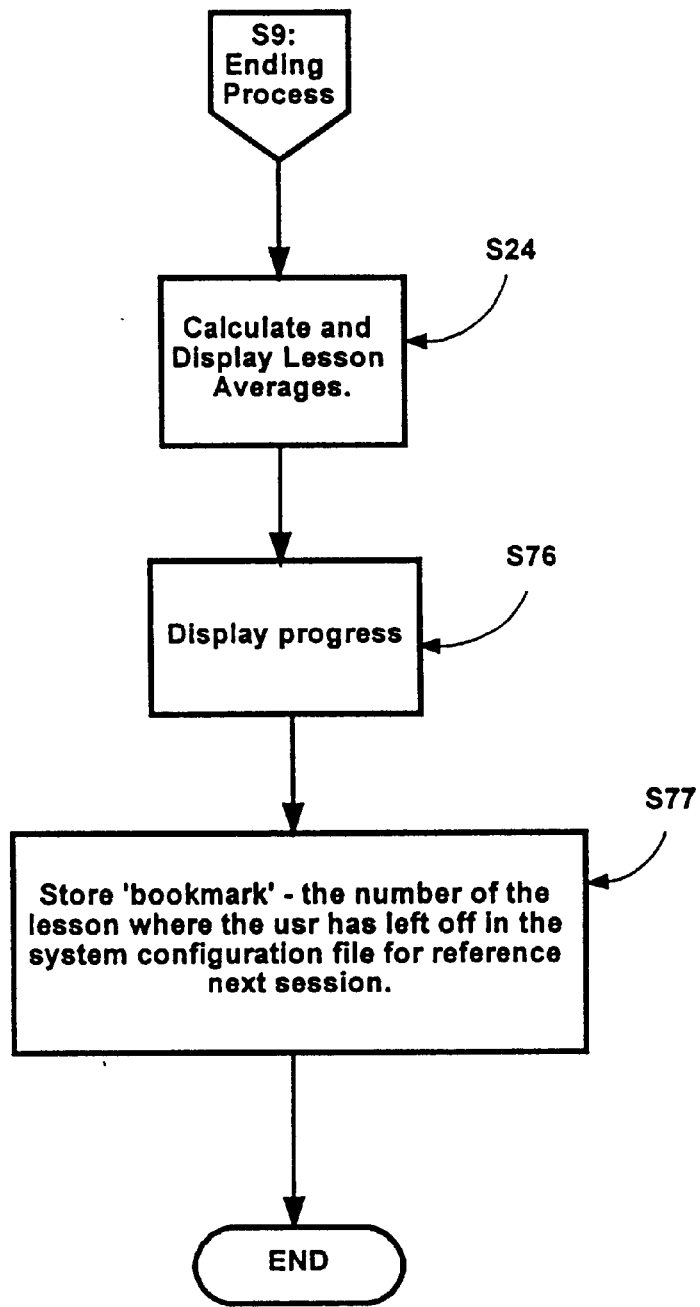
FIG. 11 is a flowchart of the process that occurs at the end of a session for an embodiment of the present invention.

FIG. 11 presents the Ending Process for an embodiment of the present invention. In step S24, lesson averages are computed and displayed again. This is the same process again which is done in the setup section. In step S76, the system displays user progress. The progress is calculated by subtracting the previous total average from the current total average, total average meaning percent of maximum total Q for all lessons. In step S77, the lesson where the user left off is stored. This is the lesson number, stored in the field called LASTLESSON in sys.dbf. If the configuration parameter (see App. A) called "Start from Lesson 1" (internally FROMTOP) is toggled "N", then the startup routine reads this value and starts at the lesson PREVIOUS to the lesson which the user was on at the end of the previous session.

FIGS. 12–18 present display screens for a system, such as a windows-based system, for a terminal, such as a personal computer.

FIG. 12 presents a display screen 10 showing where the user is asked to verify the system date and time (steps S13 and S14) for an embodiment of the present invention.

FIG. 13 is a display screen 15 showing the second screen where the user enters a password (step S16) for an embodiment of the present invention.

FIG. 14 shows a display screen 20 of the configuration parameters (step S20) for an embodiment of the present invention.

FIG. 15 contains a display screen 25 showing display of a q/a pair in EASY display mode, first two iterations (steps S41, S47, S49, and S50) for an embodiment of the present invention. In this display screen 25, the vocabulary database is for learning the second and third participles of English verbs. The question of a question/answer pair 26 is the verb 'to beat' in its first form, "beat". The expected response, "beat/beaten" 27 is shown below the answer line 28 (step S41). The user inputs a response on the answer line 28, which involves simply copying the answer for the first two of the three consecutive iterations in EASY mode. Previous errors 29, 30 are shown near the left side of the screen, as shown in FIG. 15 (step S37). On the right side of the screen 31 is shown when it was that these errors were made by the user.

FIG. 16 is a display screen 35 showing display of a q/a pair in EASY display mode, third iteration (steps S41, S47, S49, and S50). The third consecutive iteration in the EASY display mode resembles the LEARN display mode, as the answer is not provided and the user must try to remember what was just shown. Only the question 36 and the answer line 37 is shown, ready for the user's input.

FIG. 17 presents a display screen 40 showing display of a q/a pair in LEARN mode (step S41). An error 41 is shown with a marker (step S53). An additional prompt in the form of a comment 42 is shown. This is the contents of the FOOTNOTE field in the q/a pair database (see Appendix B: Data Dictionary). The last previously entered correct answer 43 remains on the screen (step S51A).

FIG. 18 is a display screen 45 showing display of a q/a in response to an in correct answer (steps S52, S53, and S48). The incorrect response is shown above the answer line at 46 with the carat symbol () below it pointing to the error (step S53). The answer line 47 now shows the correct part of the answer already given plus the next additional character from the correct answer. Originally, the required answer was 'stayed/stayed' but since the user entered 'stayed/staid', the part of the answer which was input plus the additional character 'y' stays on the answer line 48. The user needn't input these letters again, but must only complete the answer starting at 'ed' (step S48).

Embodiments of the present invention have now been described. It will be appreciated that these example are merely illustrative of the invention. Many variations and modifications will be apparent to those skilled in the art.

Appendix A: Terminology

ARRAY G—this is an array that contains most recently learned material. When elements in the array reach a certain age, which is determined by preset number of minutes (e.g., from five or up to a maximum of twenty minutes (step S28)), the system presets as the editable configuration variable CUTOFF. The array assumes control of sequencing so that the newly learned material can be reviewed before it is forgotten, thus ingraining what was in short-term memory into long-term memory. The structure of ARRAY-G consists of only two data elements per array element: 1) the record number of the q/a pair; and 2) the exact time in seconds when the Q value of the q/a pair reached the level 3.

CONFIGURATION SETTINGS—are as follows:

| Screen Prompt | Variable Name | Field name in Sys database |
|---|---|---|
| Dwell 3000 | (SPEED) | (TEMPO) |
| Diagnostics: F | (DIAG) | (DIAG) |
| Preview (T/F): T | (PREVU) | (DISPRE) |
| Repeat number: 2 | (RNO) | (RNO) |
| Repeat level: 5 | (RLev) | (RLEV) |
| Display previous errors?: T | (DISPR) | (DISPERR) |
| Show timer numbers (T/F): T | (TDIA) | (DISPTIME) |
| Start from Lesson 1: F | (FROMTOP) | (STARTUP) |
| Sound: F | (SND) | (SOUND) |
| Random sequence within lesson: T | (RND) | (RSEQ) |
| Cutoff time for the ARRAY-G: 20 | (CUTOFF) | (CUTOFF) |

DWELL: This parameter is used by the program logic as a counter to determine the timing of the displays in the "QUICK" display mode, the positive reinforcement and subliminal suggestion displays. On faster computers, dwell should be set lower, and on slower computers, dwell should be set higher. Dwell is one of three factors determining the duration of displays, the others being the length of the word, and the Q of the word.

DIAGNOSTICS: Used in system development. If set to 'T', the Q and other parameters are shown on the screen.

PREVIEW: If this parameter is toggled on, the answer is briefly displayed on the response line before the user responds, then quickly disappears. The duration of this prompt is determined by the DWELL parameter and the length and Q of the word.

REPEAT NUMBER and REPEAT LEVEL: These parameters are used at the end of a lesson to determine the sequence of lessons: the same, previous, or next lesson. The REPEAT LEVEL is a minimum Q of all the question/answer pairs of the lesson. If any question/answer pair in a lesson has a Q lower than the REPEAT LEVEL setting, the lesson is repeated unless this logic is overridden by the REPEAT NUMBER (see below). To prevent a thrashing effect (excessive repetitions), the REPEAT NUMBER is the maximum number of consecutive repetitions of the same lesson. With this parameter set to two, for example, a lesson can only be repeated twice consecutively. REPEAT NUMBER and REPEAT LEVEL are initially set to two and six respectively.

DISPLAY PREVIOUS ERRORS: Up to three wrong answers given by the user for each word are saved indefinitely or until they are replaced by more recent wrong answers. These are displayed on the screen with a pointer pointing to the incorrect part of the answer in cases where the display mode is EASY or the Q is less than 5, if this parameter is toggled "on".

SHOW TIMER NUMBERS: Timers are shown on the screen as they decrement. This can be used to optimize timing.

SOUND: Toggles audio track on/off.

RANDOM SEQUENCE: The startup process which calculates lesson averages is AVG.prg (step S54). If this configuration parameter is set to T (on), this process also refills a random field (RSEQ) and reindexes the question/answer database so that within lessons with higher than average, the question/answer pairs are presented in random order within the lesson. The user can edit the configuration settings by selecting <E>, select <S> to save the new settings, or <Q> to exit the screen without saving any changes. The screen is available at the start of a session.

CUTOFF TIME: This is the number of minutes after which elements in the array ARRAY-G are reviewed.

Display Mode—the way that a word is displayed on the screen and the associated treatment. There are four display modes: EASY, LEARN, QUICK, and REVIEW. REVIEW mode is equivalent to LEARN mode, except that in REVIEW mode, correct answers can result in incrementing the Q by more than one.

E-TIME—E-Time is the elapsed time since the Q became three. It is calculated by using time arithmetic to subtract the system time and date from the G-Time (step S28).

EASY display mode—the Question/Answer pair is presented three consecutive times. The first two times, the ANSWER is also displayed below the answer line and the user simply copies it onto the answer line. On the third time, the QUESTION is displayed on the screen without the ANSWER.

FRESH—for the purpose of response analysis, a response is considered fresh if it is correct on the first iteration. Responses that are "fresh" will cause the Q to be incremented (step S59 and S60). The Q gets decremented even when the answer is correct if it's not "fresh" (steps S61 and S62). For the purpose of determining the sequence of lessons, a lesson is considered "fresh" if all the words have a Q value equal to or greater than the configurable setting for REPEAT LEVEL (step S20). A lesson is repeated if it is not "fresh". If the lesson is "fresh", it is repeated for the configurable setting for REPEAT NUMBER (step S20) of consecutive times before proceeding to the next lesson.

G-TIME—whenever the Q of a word reaches level three, the date and time of this event is stored in the database file in the same record with the question/answer pair and also saved in the array (in RAM) ARRAY-G with the record number (step S64). G-Time is used to calculate 'E-Time' (step S28).

LEARN display mode—in this display mode, a response is requested without the ANSWER.

POSTVIEW—after a correct answer is entered, it is displayed for a time at the bottom of the screen to reinforce the user's memory (step S37). If "Display previous errors"

is toggled on in the configuration database SYS, the display mode is EASY and the Q is less than five, then the user's prior incorrect answers appear at the bottom of the screen with a pointer pointing to the incorrect part of the answer (step S53).

PREVIEW—if PREVIEW is toggled on in the configuration settings, the answer in the question/answer pair is briefly displayed on the response line in LEARN mode. The duration of this display is computed according to an algorithm that takes into account three factors: 1) the configurable setting called DWELL (step S20); 2) the relative length of the word; and 3) the Q. The PREVIEW appears very quickly. On fast machines and with low DWELL settings, it may not be consciously noticed. As a word's Q level increases, the PREVIEW display time becomes very short. This technique known as 'subliminal suggestion' (step S40).

Q—the name of this parameter is borrowed from electrical engineering because like the engineering Q, the variable represents the kind of thing that defies a more descriptive short name. Each possible value of Q is associated with a certain display mode. Each question/answer pair has its own value of Q, from 1 to 14.

TABLE 1

Display Modes correlated to values of Q

| Q | DMODE |
|---|---|
| 1 | 'EASY' |
| 2 | 'LEARN' |
| 3 or higher | 'QUICK' |

Each question/answer pair is associated with a Q value. Question/answer pairs with a Q value of one are displayed in "EASY" display mode. Those with a Q value of two are displayed in "LEARN" mode, and those with a Q value of three or higher are displayed in "QUICK" mode. An exception is words being reviewed, which are displayed in "LEARN" mode.

The Q of a question/answer pair is dynamically adjusted depending on the user's retention of the material. The Q correlates to a length of time which is allowed to elapse before a word is reviewed. The correspondence is given in Table 2. Correct answers on review questions result in setting the word's Q value to the value corresponding to the elapsed time since the word was first learned, as shown in Table 2. Q is also used to calculate the length of time that a word appears on the screen during "Quick" mode displays (step S4), and during "previews" (subliminal suggestion) (step S40).

The exact time and date of the critical graduation of Q value from two to three (G-Time) is saved in a field of the database in the same record as the question/answer pair and is also saved in the array (in RAM) ARRAY-G with the record number (step S64). The Q of each word is initially set to one.

When a word is displayed in LEARN mode (Q=2), a correct response causes the Q to be incremented by one, resulting in a Q value of three. In a review, a correct response also causes the Q to be incremented. But the new value of Q is the one associated in Table 2 with the length of time elapsed since the Q reached three (the G-time).

TABLE 2

Values of Q related to durations of time (The Q-Time Table)

| Value of Q | Q-Time |
|---|---|
| 3 | 5 seconds |
| 4 | 20 seconds |
| 5 | 1 minute |
| 6 | 10 minutes |
| 7 | 20 minutes |
| 8 | 1 day |
| 9 | 5 days |
| 10 | 10 days |
| 11 | 15 days |
| 12 | 20 days |
| 13 | 25 days |
| 14 | 30 days |

'Q-TIME'—in the sub-process (step S28) in which the timing of reviews is calculated, the Q-TIME is compared to the G-TIME to determine whether to review the word. All words with a Q of two are displayed in 'LEARN' mode. During a review, a word is displayed in 'LEARN' mode even though the Q is greater than three. This occurs at specific intervals proportionate to the demonstrated retention time of the word. In the sub-process "processes a correct response" (step S51), the Q-time is used to determine the STAKE (see below).

Question/Answer pair (q/a pair)—a question or problem associated with the answer or solution that is considered to be the correct answer or solution to the associated question or problem. Other values, such as the Q level, are associated with each question/Answer pair.

QUICK display mode—display mode where both the word and the ANSWER are briefly displayed. No active response is required of the user.

Response line—an area on the screen where the user keys in a response. In the GUI version of LANG, hints that would appear on the response line take another form, either blinking the correct area on the screen where the correct answer appears or displaying the correct area in a contrasting color.

REVIEW—for words with a Q value of three or more, the word gets displayed in 'QUICK" or 'Review' display mode. The determination of mode is made by comparing two parameters (step S28): 1) the E-Time (the elapsed time since the Q reached three, which is calculated by subtracting the system time from the G-Time—the time stored when the Q reaches three (step S64); and 2) the Q-Time, which is the amount of time associated with the Q (see Table 2). If the E-Time is greater than the Q-Time, it is time for a review.

Two things happen at the E-Time. First, a value called 'STAKE' is calculated. This is the value of Q that the word will have if the user answers correctly during the review. It represents the amount of time that the user has retained the answer. A correct answer given during a review demonstrates that the user has retained the answer in memory for an amount of time at least as long as the E-Time. The 'STAKE' is calculated by determining the Q with an associated Q-Time closest to the E-Time (step S30) (see Table 2). Second, once the STAKE has been calculated, the question of the question/answer pair is displayed in LEARN mode (step S42). If the user answers correctly, the Q is incremented to the value of STAKE (step S59).

Incorrect answers cause the Q to be reset to two in both review and normal LEARN modes, thereby reinitiating a fresh learning cycle for the word (step S61).

REVIEW display mode—this is identical to LEARN mode, except it recurs at specific intervals after the word has already been initially learned. If the answer is correct, the Q is incremented to correspond to the amount of time elapsed since the Q of the question/answer reached level 3.

STAKE—correct responses to reviews cause a word's 'Q' value to be incremented to this amount, which corresponds to the minimum amount of time since the user demonstrated that the user retained the correct answer. For example, if a q/a pair has an E-time of 5 days, the STAKE would be the Q value in the Q-Time Table that corresponds to 5 days, which is 9.

Appendix B: Data Dictionary

| Field Name | Type | Length | De-cimals | Description of field |
|---|---|---|---|---|
| SYS.dbf, the system configuration file: | | | | |
| LASTLESSON | N | 6 | 2 | Last lesson presented to the user |
| DISPRE | L | 1 | 0 | Display previews |
| TEMPO | N | 10 | 0 | Timing factor SPEED |
| POST | L | 1 | 0 | Display "post-view" |
| RNO | N | 1 | 0 | Lesson Repetitions (number of consecutive repetitions) |
| Rlev | N | 1 | 0 | Lesson Repeat Level (level below which a lesson is repeated) |
| STARTUP | L | 1 | 0 | Start at lesson 1 |
| RSEQ | L | 1 | 0 | Randomize sequence within lesson (RND) |
| CUTOFF | N | 2 | 0 | Critical age of array element to pass sequencing control to the array. |
| DISPERR | L | 1 | 0 | Display user's previous incorrect answers |
| DISPTIME | L | 1 | 0 | Display timer numbers |
| LANG.dbf, the question/answer pair database file: | | | | |
| LESSON | N | 6 | 0 | Lesson number |
| SEQNO | N | 6 | 0 | Default sequence within a lesson |
| RSEQ | N | 6 | 0 | Random sequence number within a lesson |
| W1 | C | 65 | 0 | Question or problem |
| W2 | C | 65 | 0 | Required answer or solution |
| ANSWRNG1 | C | 65 | 0 | Previous wrong answer 1 |
| WRNGDT1 | D | 8 | 0 | Date of previous wrong answer 1 |
| ANSWRNG2 | C | 65 | 0 | Previous wrong answer 2 |
| WRNGDT2 | D | 8 | 0 | Date of previous wrong answer 2 |
| Q | N | 4 | 0 | Retention level(1–14) |
| CHGDATE | D | 8 | 0 | Date when Q reaches the level 3 |
| CHGTIME | C | 8 | 0 | Time when Q reaches the level 3 |
| ANSMSG | C | 65 | 0 | Optional way to display answer |
| FOOTNOTE | C | 65 | 0 | Additional prompt |

I claim:

1. A method for a user to reinforce long term memory of the user, comprising:

identifying the user;

selecting a lesson having a plurality of queries;

determining a level value for the user;

identifying a previous review of the user, the previous review having an associated time of occurrence;

if the level value of the user is greater than a predetermined level value, determining an amount of time that has passed since the previous review;

comparing the amount of time that has passed since the previous review to a predetermined period; and if the amount of time that has passed since the previous review is greater than the predetermined period, performing a reviews;

providing a system prompt for each of the plurality of queries, the system prompt varying depending on the level value of the user;

receiving a user response to each of the plurality of queries;

comparing the user response to a predetermined correct response for each of the plurality of queries; and redetermining the level value for the user.

2. The method of claim 1, wherein the level value of the user comprises one selected from a plurality of level values.

3. The method of claim 1, further comprising scoring the user, the scoring including using an algorithm, wherein the algorithm is used to link short term memory to long term memory.

4. The method of claim 3, wherein the algorithm includes a plurality of Q values.

5. The method of claim 4, wherein the review includes learned material and forgotten material, wherein the plurality of Q values range from a low value assigned to the forgotten material to a high value corresponding to learned material, and wherein the material to be learned has an associated Q value.

6. The method of claim 5, wherein the learned material comprises material for which at least one correct answer to at least one query has been received for a time period at least equal to a preselected time period.

7. The method of claim 6, wherein the preselected time period is 30 days.

8. The method of claim 5, wherein the low Q value is 1 and the high Q value is 14.

9. The method of claim 3, wherein the review material includes learned material and forgotten material, the learned material having an associated date and time of learning, and wherein the algorithm includes an actual elapsed time period since the associated date and time of the learned material.

10. The method of claim 9, wherein the learned material has at least one associated query for which a correct response has been received from the user.

11. The method of claim 4, wherein the algorithm includes a lookup value.

12. The method of claim 11, wherein the lookup value comprises a time value associated with each of the plurality of Q values.

13. The method of claim 12, wherein the time value associated with each of the plurality of Q values varies so as to reinforce association of the short term memory of the user with the long term memory of the user.

14. The method of claim 13, wherein scoring the user comprises determining a number of correct responses to the plurality of queries, further comprising updating the Q value for each of the plurality of queries.

15. The method of claim 14, wherein updating the Q value for each of the plurality of queries includes increasing or decreasing the Q value for each query depending on the response to the query.

16. The method of claim 15, further comprising determining whether the user previously provided the correct response to the query, and if the user provides the correct response to the query, increasing the Q value for the query by a value increment, the value increment depending on the level of the user.

17. The method of claim 15, further comprising determining whether the query was previously provided to the user, and if the query was not previously provided to user and if the user provides the correct response to the query, increasing the Q value for the query by one.

18. The method of claim 15, further comprising determining whether the query was previously provided to the user, and if the query was previously provided to user and if the user does not provide the correct response to the query, decreasing the Q value for the query by at least one.

19. The method of claim 15, further comprising determining whether the query was previously provided to the user, and if the query was not previously provided to user and if the user does not provide the correct response to the query, decreasing the Q value for the query by one.

20. The method of claim 15, further comprising determining whether the user previously provided the correct response to the query, and if the user provides the correct response to the query, increasing the Q value for the query by one.

21. The method of claim 1, further comprising providing a prompt to the user, the prompt varying depending on the level value of the user.

22. The method of claim 21, wherein the prompt comprises displaying an answer for each of the plurality of queries.

23. The method of claim 21, wherein the prompt comprises displaying each of the plurality of queries without displaying an answer.

24. The method of claim 21, wherein the prompt comprises displaying for an intermittent time period an answer for each of the plurality of queries.

25. The method of claim 24, wherein the intermittent time period is a subliminally short time period.

26. The method of claim 1, wherein the level value of the user includes an associated mode, the associated mode selected from the group comprising EASY mode, LEARN mode, and QUICK mode, the method further comprising providing a prompt to the user, the prompt varying depending on the mode, wherein the prompt for QUICK mode comprises displaying for an intermittent time period an answer for each of the plurality of queries, and wherein the intermittent time period varies depending on the Q value for the query.

27. The method of claim 1, further comprising:
determining whether each of the plurality of queries was previously provided to the user;
for each of the plurality of queries previously provided to the user, determining whether the user previously provided an incorrect response;
receiving a selection to display previous incorrect responses to each of the plurality of queries; and
displaying the previous incorrect response for each of the plurality of queries for which incorrect responses were received.

28. The method of claim 1, wherein the level value of the user comprises one from the group consisting of a first mode, a second mode, and a third mode.

29. A method for a user to reinforce long term memory of the user, comprising:

identifying the user;
selecting a lesson having a plurality of queries;
determining a level for the user;
providing a system prompt for each of the plurality of queries, the system prompt varying depending on the determined level for the user;
receiving a user response to each of the plurality of queries;
comparing the user response to a predetermined correct response for each of the plurality of queries;
redetermining the level for the user;
determining whether the user was previously provided each of the plurality of queries;
determining a reinforcement value for each of the plurality of queries;
if the user response was correct and the user was previously provided the query, increasing the reinforcement value by a value increment associated with the level for the user;
if the user response was correct and the user was not previously provided the query, increasing the reinforcement value by a first value increment;
if the user response was incorrect and the user was previously provided the query, decreasing the reinforcement value by the second value increment, wherein the second value increment is at least equal to the first value increment; and
if the user response was incorrect and the user was not previously provided the query, decreasing the reinforcement value by the first value increment.

30. A method for a user to reinforce long term memory of the user, comprising:

identifying the user;
selecting a lesson having a plurality of queries;
determining a level for the user;
providing a system prompt for each of the plurality of queries, the system prompt varying depending on the determined level of the user;
receiving a user response to each of the plurality of queries;
comparing the user response to a predetermined correct response for each of the plurality of queries;
redetermining the level for the user;
determining a correct portion of the user response to each of the plurality of queries;
displaying the correct portion of the user response to each of the plurality of queries; and
indicating the incorrect portion of the user response to each of the plurality of queries.

* * * * *